US009009728B2

(12) United States Patent
Allen et al.

(10) Patent No.: US 9,009,728 B2
(45) Date of Patent: Apr. 14, 2015

(54) METHOD AND APPARATUS FOR WIDGET AND WIDGET-CONTAINER DISTRIBUTION CONTROL BASED ON CONTENT RULES

(75) Inventors: Stewart O. Allen, Reston, VA (US); Scott F. Cosby, Rye, NY (US); Hasseltine R. Debutts, Upperville, VA (US); John A. Fath, Arlington, VA (US); Matthew J. Keesan, Washington, DC (US); Hooman Radfar, Arlington, VA (US); Carlos F. Reverte, Miami, FL (US)

(73) Assignee: AddThis, Inc., Vienna, VA (US)

( * ) Notice: Subject to any disclaimer, the term of this patent is extended or adjusted under 35 U.S.C. 154(b) by 1842 days.

(21) Appl. No.: 11/682,639

(22) Filed: Mar. 6, 2007

(65) Prior Publication Data

US 2008/0222658 A1    Sep. 11, 2008

(51) Int. Cl.
*G06F 3/00* (2006.01)
*G06F 17/30* (2006.01)
*G06F 21/62* (2013.01)

(52) U.S. Cl.
CPC .... *G06F 21/6209* (2013.01); *G06F 2221/2111* (2013.01)

(58) Field of Classification Search
USPC .............................. 715/749; 719/311; 726/26
See application file for complete search history.

(56) References Cited

U.S. PATENT DOCUMENTS

| | | | |
|---|---|---|---|
| 5,230,072 A | 7/1993 | Smith et al. | |
| 5,261,002 A | 11/1993 | Perlman et al. | |
| 5,675,510 A | 10/1997 | Coffey et al. | |
| 5,781,189 A | 7/1998 | Holleran et al. | |
| 5,796,952 A | 8/1998 | Davis et al. | |
| 5,857,102 A | 1/1999 | McChesney et al. | |
| 5,862,377 A | 1/1999 | Lee | |
| 5,892,900 A | 4/1999 | Ginter et al. | |
| 5,896,532 A | 4/1999 | Blewett | |
| 5,951,643 A | 9/1999 | Shelton et al. | |
| 6,064,980 A | 5/2000 | Jacobi et al. | |
| 6,100,890 A | 8/2000 | Bates et al. | |
| 6,108,637 A | 8/2000 | Blumenau | |
| 6,112,238 A | 8/2000 | Boyd et al. | |

(Continued)

FOREIGN PATENT DOCUMENTS

| | | |
|---|---|---|
| EP | 0 996 058 A1 | 10/1998 |
| EP | 1942422 A1 | 7/2008 |

(Continued)

OTHER PUBLICATIONS

International Search Report and Written Opinion for International Application No. PCT/US08/55756, mailed Aug. 1, 2008, 7 pages.

(Continued)

*Primary Examiner* — Charles E Anya
(74) *Attorney, Agent, or Firm* — Cooley LLP

(57) ABSTRACT

A method includes receiving an instruction used to define a widget-container containing a service module associated with a widget. The widget-container is a procedural software framework configured to be executed at a widget-container processing device in response to a reference to the widget-container being accessed from a content aggregation point. The widget-container has a portion configured for receiving the widget. The method also includes determining whether processing of the widget within the portion of the widget-container is restricted and/or allowed.

21 Claims, 6 Drawing Sheets

(56) References Cited

U.S. PATENT DOCUMENTS

| | | |
|---|---|---|
| 6,125,388 A | 9/2000 | Reisman |
| 6,233,601 B1 | 5/2001 | Walsh |
| 6,233,684 B1 | 5/2001 | Stefik et al. |
| 6,236,971 B1 | 5/2001 | Stefik et al. |
| 6,266,649 B1 | 7/2001 | Linden et al. |
| 6,269,361 B1 | 7/2001 | Davis et al. |
| 6,311,194 B1 | 10/2001 | Sheth et al. |
| 6,314,448 B1 | 11/2001 | Conner et al. |
| 6,317,787 B1 | 11/2001 | Boyd et al. |
| 6,360,261 B1 | 3/2002 | Boyd et al. |
| 6,374,252 B1 | 4/2002 | Altoff et al. |
| 6,466,974 B1 | 10/2002 | Nelson et al. |
| 6,546,393 B1 | 4/2003 | Khan |
| 6,658,568 B1 | 12/2003 | Ginter et al. |
| 6,665,867 B1 | 12/2003 | Ims et al. |
| 6,701,521 B1 | 3/2004 | McLlroy et al. |
| 6,748,555 B1 | 6/2004 | Teegan et al. |
| 6,772,180 B1 | 8/2004 | Li et al. |
| 6,810,356 B1 | 10/2004 | Garcia-Franco et al. |
| 6,857,124 B1 | 2/2005 | Doyle |
| 6,970,853 B2 | 11/2005 | Schutzer |
| 6,985,905 B2 | 1/2006 | Prompt et al. |
| 6,985,929 B1 | 1/2006 | Wilson et al. |
| 6,986,049 B2 | 1/2006 | Delany |
| 7,003,522 B1 | 2/2006 | Reynar et al. |
| 7,003,565 B2 | 2/2006 | Hind et al. |
| 7,016,960 B2 | 3/2006 | Howard et al. |
| 7,024,392 B2 | 4/2006 | Stefik et al. |
| 7,031,932 B1 | 4/2006 | Lipsky et al. |
| 7,035,943 B2 | 4/2006 | Yamane et al. |
| 7,039,599 B2 | 5/2006 | Merriman et al. |
| 7,046,995 B2 | 5/2006 | Rygaard |
| 7,054,900 B1 | 5/2006 | Goldston |
| 7,062,500 B1 | 6/2006 | Hall et al. |
| 7,062,540 B2 | 6/2006 | Reddy et al. |
| 7,062,561 B1 | 6/2006 | Reisman |
| 7,072,672 B1 | 7/2006 | Vanska et al. |
| 7,076,521 B2 | 7/2006 | Davison |
| 7,080,159 B2 | 7/2006 | Chu et al. |
| 7,085,682 B1 | 8/2006 | Heller et al. |
| 7,089,237 B2 | 8/2006 | Turnbull et al. |
| 7,099,926 B1 | 8/2006 | Ims et al. |
| 7,100,054 B2 | 8/2006 | Wenisch et al. |
| 7,103,912 B2 | 9/2006 | Xia et al. |
| 7,117,250 B1 | 10/2006 | Wu |
| 7,117,535 B1 | 10/2006 | Wecker |
| 7,130,964 B2 | 10/2006 | Ims et al. |
| 7,133,846 B1 | 11/2006 | Ginter et al. |
| 7,159,116 B2 | 1/2007 | Moskowitz |
| 7,263,551 B2 | 8/2007 | Belfiore et al. |
| 7,269,792 B2 * | 9/2007 | Consolatti et al. ............ 715/749 |
| 7,346,909 B1 | 3/2008 | Eldar et al. |
| 7,392,395 B2 | 6/2008 | Ginter et al. |
| 7,392,483 B2 | 6/2008 | Wong et al. |
| 7,702,675 B1 | 4/2010 | Khosla et al. |
| 7,730,082 B2 * | 6/2010 | Sah et al. ...................... 707/770 |
| 7,735,117 B2 | 6/2010 | Nadalin et al. |
| 8,150,939 B1 * | 4/2012 | Murray ......................... 709/217 |
| 2002/0040314 A1 | 4/2002 | Tolson |
| 2002/0040394 A1 | 4/2002 | Shapira |
| 2002/0072965 A1 | 6/2002 | Merriman et al. |
| 2002/0082914 A1 | 6/2002 | Beyda et al. |
| 2002/0082923 A1 | 6/2002 | Merriman et al. |
| 2002/0082997 A1 | 6/2002 | Kobata et al. |
| 2002/0083188 A1 | 6/2002 | Hericy et al. |
| 2002/0095336 A1 | 7/2002 | Trifon et al. |
| 2002/0099600 A1 | 7/2002 | Merriman et al. |
| 2002/0120673 A1 | 8/2002 | Tolson et al. |
| 2002/0129092 A1 | 9/2002 | Tolson et al. |
| 2002/0174200 A1 | 11/2002 | Kozina |
| 2003/0014483 A1 | 1/2003 | Stevenson et al. |
| 2003/0028433 A1 | 2/2003 | Merriman et al. |
| 2003/0033403 A1 | 2/2003 | Rhodes |
| 2003/0058277 A1 | 3/2003 | Bowman-Amuah |
| 2003/0070061 A1 | 4/2003 | Wong et al. |
| 2003/0105882 A1 | 6/2003 | Ali et al. |
| 2003/0196121 A1 | 10/2003 | Raley et al. |
| 2003/0200145 A1 | 10/2003 | Krassner et al. |
| 2004/0073755 A1 | 4/2004 | Webb et al. |
| 2004/0098349 A1 | 5/2004 | Tolson |
| 2004/0107125 A1 | 6/2004 | Guheen et al. |
| 2004/0143667 A1 | 7/2004 | Jerome |
| 2004/0153973 A1 | 8/2004 | Horwitz |
| 2004/0165007 A1 | 8/2004 | Shafron |
| 2004/0172324 A1 | 9/2004 | Merriman et al. |
| 2004/0172331 A1 | 9/2004 | Merriman et al. |
| 2004/0172332 A1 | 9/2004 | Merriman et al. |
| 2004/0215509 A1 | 10/2004 | Perry |
| 2004/0215515 A1 | 10/2004 | Perry |
| 2004/0215709 A1 | 10/2004 | Basani et al. |
| 2004/0225562 A1 | 11/2004 | Turner |
| 2004/0225566 A1 | 11/2004 | Beyda et al. |
| 2004/0225668 A1 | 11/2004 | Teegan et al. |
| 2005/0021611 A1 | 1/2005 | Knapp et al. |
| 2005/0038702 A1 | 2/2005 | Merriman et al. |
| 2005/0050301 A1 | 3/2005 | Whittle et al. |
| 2005/0055458 A1 | 3/2005 | Mohan et al. |
| 2005/0086587 A1 | 4/2005 | Balz |
| 2005/0114774 A1 | 5/2005 | Berryman |
| 2005/0125528 A1 | 6/2005 | Burke, II et al. |
| 2005/0190994 A1 | 9/2005 | Yamanaka |
| 2005/0197991 A1 | 9/2005 | Wray et al. |
| 2005/0198105 A1 | 9/2005 | Schmitz et al. |
| 2005/0198201 A1 | 9/2005 | Bohn et al. |
| 2005/0210000 A1 | 9/2005 | Michard |
| 2005/0228863 A1 * | 10/2005 | Palmeri et al. ................. 709/205 |
| 2005/0246262 A1 | 11/2005 | Aggarwal et al. |
| 2005/0251805 A1 | 11/2005 | Bamba et al. |
| 2005/0256819 A1 | 11/2005 | Tibbs et al. |
| 2005/0256954 A1 | 11/2005 | Shapira et al. |
| 2006/0004703 A1 | 1/2006 | Spivack et al. |
| 2006/0015406 A1 | 1/2006 | Beyda et al. |
| 2006/0040426 A1 | 2/2006 | Antesberger et al. |
| 2006/0088044 A1 | 4/2006 | Hammerl |
| 2006/0089880 A1 | 4/2006 | Merriman et al. |
| 2006/0106876 A1 | 5/2006 | MacGregor |
| 2006/0112102 A1 | 5/2006 | Shafron |
| 2006/0112341 A1 | 5/2006 | Shafron |
| 2006/0129937 A1 | 6/2006 | Shafron |
| 2006/0136843 A1 | 6/2006 | Shafron |
| 2006/0161513 A1 | 7/2006 | Drumm et al. |
| 2006/0178918 A1 | 8/2006 | Mikurak |
| 2006/0190290 A1 | 8/2006 | Gomez |
| 2006/0212589 A1 | 9/2006 | Hayer et al. |
| 2006/0218036 A1 | 9/2006 | King et al. |
| 2006/0242379 A1 | 10/2006 | Korgaonkar et al. |
| 2006/0259462 A1 | 11/2006 | Timmons |
| 2006/0277457 A1 | 12/2006 | Salkind et al. |
| 2007/0038934 A1 * | 2/2007 | Fellman ........................ 715/700 |
| 2007/0078777 A1 | 4/2007 | Demartini et al. |
| 2007/0078953 A1 | 4/2007 | Chai et al. |
| 2007/0101146 A1 * | 5/2007 | Louch et al. ................... 713/176 |
| 2007/0101291 A1 | 5/2007 | Forstall et al. |
| 2007/0101297 A1 * | 5/2007 | Forstall et al. ................. 715/841 |
| 2007/0106759 A1 * | 5/2007 | Willie et al. ................... 709/219 |
| 2007/0112676 A1 | 5/2007 | Kontio et al. |
| 2007/0130541 A1 | 6/2007 | Louch et al. |
| 2007/0192329 A1 | 8/2007 | Croft et al. |
| 2007/0192339 A1 | 8/2007 | Baker et al. |
| 2007/0209013 A1 | 9/2007 | Ramsey et al. |
| 2007/0250618 A1 | 10/2007 | Hammond |
| 2007/0266093 A1 * | 11/2007 | Forstall et al. ................. 709/204 |
| 2007/0288518 A1 | 12/2007 | Crigler et al. |
| 2007/0288858 A1 | 12/2007 | Pereira et al. |
| 2008/0010133 A1 | 1/2008 | Pyhalammi et al. |
| 2008/0010319 A1 | 1/2008 | Vonarburg et al. |
| 2008/0028294 A1 | 1/2008 | Sell et al. |
| 2008/0034040 A1 | 2/2008 | Wherry et al. |
| 2008/0034314 A1 | 2/2008 | Louch et al. |
| 2008/0040426 A1 | 2/2008 | Synstelien et al. |
| 2008/0040681 A1 | 2/2008 | Synstelien et al. |
| 2008/0071883 A1 | 3/2008 | Alterman |
| 2008/0082627 A1 | 4/2008 | Allen et al. |
| 2008/0091777 A1 | 4/2008 | Carlos |

(56) References Cited

U.S. PATENT DOCUMENTS

| | | | |
|---|---|---|---|
| 2008/0097871 A1 | 4/2008 | Williams et al. | |
| 2008/0104496 A1 | 5/2008 | Williams et al. | |
| 2008/0140775 A1 | 6/2008 | Lee et al. | |
| 2008/0141141 A1 | 6/2008 | Moore et al. | |
| 2008/0141153 A1 | 6/2008 | Samson et al. | |
| 2008/0148283 A1 | 6/2008 | Allen et al. | |
| 2008/0168245 A1 | 7/2008 | De Atley et al. | |
| 2008/0168391 A1 | 7/2008 | Robbin et al. | |
| 2008/0215879 A1* | 9/2008 | Williams et al. | 713/159 |
| 2008/0215998 A1* | 9/2008 | Moore et al. | 715/762 |
| 2008/0222232 A1 | 9/2008 | Allen et al. | |
| 2008/0222295 A1 | 9/2008 | Robinson et al. | |
| 2008/0222613 A1 | 9/2008 | Allen et al. | |
| 2008/0232560 A1 | 9/2008 | Sirkin | |
| 2008/0255962 A1 | 10/2008 | Chang et al. | |
| 2008/0319856 A1 | 12/2008 | Zito et al. | |
| 2009/0013058 A1 | 1/2009 | Chan | |
| 2009/0024943 A1 | 1/2009 | Adler et al. | |
| 2009/0037509 A1 | 2/2009 | Parekh et al. | |
| 2009/0070409 A1 | 3/2009 | Clayton et al. | |
| 2009/0094339 A1 | 4/2009 | Allen et al. | |
| 2009/0111448 A1 | 4/2009 | Paila | |
| 2009/0144429 A1 | 6/2009 | Astrom | |
| 2009/0180412 A1 | 7/2009 | Albert et al. | |
| 2009/0204885 A1 | 8/2009 | Ellsworth et al. | |
| 2009/0216634 A1 | 8/2009 | Peltonen et al. | |
| 2009/0265213 A1 | 10/2009 | Hyman et al. | |
| 2009/0288004 A1 | 11/2009 | Strandell et al. | |
| 2010/0030901 A1 | 2/2010 | Hallberg et al. | |
| 2010/0100605 A1 | 4/2010 | Allen et al. | |
| 2010/0100626 A1 | 4/2010 | Allen et al. | |
| 2010/0138295 A1 | 6/2010 | Caron et al. | |
| 2011/0099487 A1* | 4/2011 | Pyhalammi et al. | 715/762 |

FOREIGN PATENT DOCUMENTS

| | | |
|---|---|---|
| JP | 2005-346434 A | 12/2005 |
| WO | 0186384 A2 | 11/2001 |
| WO | WO 01/86384 A2 | 11/2001 |
| WO | 0221404 A1 | 3/2002 |
| WO | WO 02/21404 A1 | 3/2002 |
| WO | WO 2006/028488 A2 | 3/2006 |
| WO | WO 2008/052013 A2 | 5/2008 |
| WO | WO 2008/060828 A2 | 5/2008 |

OTHER PUBLICATIONS

Daily Flash Performance Report :: MochiBot.com Traffic Report Tour [online], [retrieved on Jan. 11, 2006]. Retrieved from the Internet: <URL: http://www.mochibot.com/tour_trafficreport.html>. (2 pgs).
Final Office Action mailed Jul. 8, 2010 for U.S. Appl. No. 11/537,362, filed Sep. 29, 2006.
Final Office Action mailed Jul. 8, 2010 for U.S. Appl. No. 11/682,626, filed Mar. 6, 2007.
Flash Traffic Analysis for a SWF :: MochiBot.com SWF Detail Tour [online], [retrieved on Jan. 11, 2006]. Retrieved from the Internet: <URL: http://www.mochibot.com/tour_swfdetail.html>. (2 pgs).
International Search Report and Written Opinion for International Application No. PCT/US08/56073, mailed Aug. 8, 2008, 8 pages.
International Search Report and Written Opinion for International Application No. PCT/US08/78744, mailed Jan. 12, 2009, 9 pages.
International Search Report and Written Opinion mailed Apr. 18, 2008 for International Application No. PCT/US07/80086, 9 pages.
International Search Report and Written Opinion mailed Jul. 25, 2008 for International Application No. PCT/US08/55755, 8 pages.
Office Action mailed Dec. 10, 2009 for U.S. Appl. No. 11/537,362, filed Sep. 29, 2006.
Office Action mailed Jan. 11, 2010 for U.S. Appl. No. 11/682,626, filed Mar. 6, 2007.
Office Action mailed Jul. 7, 2010 for U.S. Appl. No. 11/537,375, mailed Sep. 29, 2006.
Office Action mailed Jun. 18, 2009 for U.S. Appl. No. 11/682,626, filed Mar. 6, 2007.
Office Action mailed Jun. 22, 2010 for U.S. Appl. No. 12/244,606, filed Oct. 2, 2008.
Office Action mailed Jun. 24, 2010 for U.S. Appl. No. 12/043,805, filed Mar. 6, 2008.
Office Action mailed May 21, 2010 for U.S. Appl. No. 11/774,470, filed Jul. 6, 2007.
Overview of the SWFs you are tracking :: MochiBot.com Dasboard Tour [online], [retrieved on Jan. 11, 2006]. Retrieved from the Internet: <URL: http://www.mochibot.com/tour_dashboard.html>. (2 pgs).
See who's hosting your SWF :: MochiBot.com Host Report Tour [online], [retrieved on Jan. 11, 2006]. Retrieved from the Internet: <URL: http://www.mochibot.com/tour_hostreport.html>. (2 pgs).
Supplementary European Search Report for European Patent Application No. 07843614.4, mailed Aug. 30, 2010.
Final Office Action mailed Nov. 5, 2010 for U.S. Appl. No. 11/774,470, filed Jul. 6, 2007.
Daniel Salber, Anind K. Dey, Gregory D. Abowd, "The context toolkit: aiding the development of context-enabled applications", Proceedings of the SIGCHI conference on Human factors in computing systems: the CHI is the limit, p. 434-441, May 15-20, 1999 [retrieved from the ACM database on Jun. 15, 2010].
Tody, D. A portable GUI Development System—The IRAF Widget Server, Astronomicla Data Analysis Software and Systems IV; ASP Conference Series, vol. 77, 1995 [retrieved from the Internet "http://articles.adsabs.harvard.edu/cgi-bin/nph-iarticle_query?1995ASPC...77...89T&defaultprint=YES&filetype=.pdf" on Jun. 15, 2010].
Luyten, K., and Coninx, K., Uiml.net: an Open Uimi Renderer for the .Net Framework, in R. Jacob, Q. Limbourg, J. Vanderdonckt (eds.), Proc. of 5th Int. Conf. of Computer-Aided Design of User Interfaces CADUI'2004. Jan. 2004. Information Systems Series, Kluwer Academics, Dordrecht, 2005, pp. 259-270. [retrieved from the internet Jun. 15, 2010].
Office Action mailed Dec. 8, 2010 for U.S. Appl. No. 12/043,805, filed Mar. 6, 2008.
Supplemental Office Action mailed Jan. 21, 2011 for U.S. Appl. No. 12/043,805, filed Mar. 6, 2008.
Final Office Action mailed Feb. 16, 2011 for U.S. Appl. No. 11/537,375, filed Sep. 29, 2006.
Office Action mailed Mar. 16, 2011 for U.S. Appl. No. 12/244,606, filed Oct. 2, 2008.
Office Action mailed Sep. 2, 2011 for U.S. Appl. No. 12/043,805, filed Mar. 6, 2008.
Office Action mailed Jun. 13, 2011 for U.S. Appl. No. 12/560,127, filed Sep. 15, 2009.
Office Action mailed Jun. 13, 2011 for U.S. Appl. No. 12/560,159, filed Sep. 15, 2009.
Schulte, Window Programming in Mozart, (Jan. 25, 2003) http://grauhart.rz.ifi.lmu.de/programming/mozart/print/tutorial/WindowProgramming.pdf.
Ryu et al. Widget Integration Framework for Context-Aware Middleware, MATA 2005, LNCS 3744, Springer-Verlag, 2005, pp. 161-171.
Goland et al., Simple Service Discovery Protocol, <draft-cai-ssdp-vl-03.txt>, 1999.
Amulet Technologies, Inter-Widget Communication, 2004, http://web.mit.edu/6.115/www/miscfiles/amulet/amulet-help/IWC.htm.
Liscano & Ghavam, Context Awareness and Service Discovery for Spontaneous Networking, School of Information Technology and Engineering (SITE), University of Ottawa, Ottawa, Ontario, (2003).
Wang et al., Grid-based Collaboration in Interactive Data Language Applications, Proceedings of the International Conference on Information Technology, Coding and Computing, IEEE (2005).
Office Action mailed Apr. 9, 2013 for U.S. Appl. No. 11/537,375.
G. Klinker, Augmented Reality II—Context Toolkit, May 27, 2003.
Office Action mailed Apr. 25, 2012 for U.S. Appl. No. 12/560,159.
Widgetbox, Widgetizing the Web [online], [retrieved on Jan. 11, 2006]. Retrieved from the Internet: <URL: http://widgetbox.com>. (3 pgs).

(56) References Cited

OTHER PUBLICATIONS

MochiBot, "It's 3a.m. Do you know where your Flash content is?", Flash tracking, Traffic Monitoring, and Analytics Service [online], [retrieved on Jan. 11, 2006]. Retrieved from the Internet: <URL: MochiBot.com, http://www.mochibot.com>. (4 pgs).

Overview of the SWFs you are tracking : MochiBot.com Dasboard Tour [online], [retrieved on Jan. 11, 2006]. Retrieved from the Internet: <URL: http://www.mochibot.com/tour_dashboard.html>. (2 pgs).

Flash Traffic Analysis for a SWF : MochiBot.com SWF Detail Tour [online], [retrieved on Jan. 11, 2006]. Retrieved from the Internet <URL: http://www.mochibot.com/tour_swfdetail.html>. (2 pgs).

See who's hosting your SWF : MochiBot.com Host Report Tour [online], [retrieved on Jan. 11, 2006]. Retrieved from the Internet: <URL: http://www.mochibot.com/tour_hostreport.html>. (2 pgs).

Daily Flash Performance Report : MochiBot.com Traffic Report Tour [online], [retrieved on Jan. 11, 2006]. Retrieved from the Internet: <URL: http://www.mochibot.com/tour_trafficreport.html>. (2 pgs).

Snipperoo Web Widgets, Snipperoo Universal Widget [online], [retrieved on Jan. 11, 2006]. Retrieved from the Internet: <URL: http://www.snipperoo.com/>. (1 pg).

* cited by examiner

| Widget Container 310 | Widget 320 | Placement identifier 330 | Content Aggregation Point 345 | Content Aggregation Point Identifier 340 | Widget Rendering Allowed 350 | Widget-Container Allowed 360 |
|---|---|---|---|---|---|---|
| A | W | P1 | X | URI1 | Yes | Yes |
|   |   | P2 | Y | URI2 | No | Yes |

FIG. 3

METHOD AND APPARATUS FOR WIDGET AND WIDGET-CONTAINER DISTRIBUTION CONTROL BASED ON CONTENT RULES

BACKGROUND

The disclosed invention relates generally to control of distribution of content over a network, and in particular, to control of processing and/or distribution of static, media, and/or software objects in a procedural software framework.

The world wide web is a platform that has been used to exchange various forms of content including videos, text, music, etc. Often this content is distributed to users and/or computers in an ad-hoc fashion, for example, using e-mail or as files embedded in a web-page. Recently, various forms of "viral" distribution or replication of content have been developed that allow users to more easily spread content to other users than previously known ad-hoc methods. Although these viral distribution methods are more convenient than distributing content in an ad-hoc fashion, they have many shortcomings. For example, they do not provide for methods to control undesirable distribution of content based on criteria defined by, for example, an owner of the content. In other words, the spreading of content using ad-hoc methods and/or forms of viral spreading cannot be controlled in a useful way. Thus, there is a need for an apparatus and method for restricting or permitting the distribution of content.

SUMMARY OF THE INVENTION

A method includes receiving an instruction used to define a widget-container containing a service module associated with a widget. The widget-container is a procedural software framework configured to be executed at a widget-container processing device in response to a reference to the widget-container being accessed from a content aggregation point. The widget-container has a portion configured for receiving the widget. The method also includes determining whether processing of the widget within the portion of the widget-container is restricted and/or allowed.

BRIEF DESCRIPTION OF THE DRAWINGS

The present invention is described with reference to the accompanying drawings. In the drawings, identical or like reference numbers indicate identical or functionally similar elements.

FIG. 3 is a table that illustrates a set of control rules that are based on content aggregation point identifiers, according to an embodiment of the invention.

DETAILED DESCRIPTION

Figure 1:
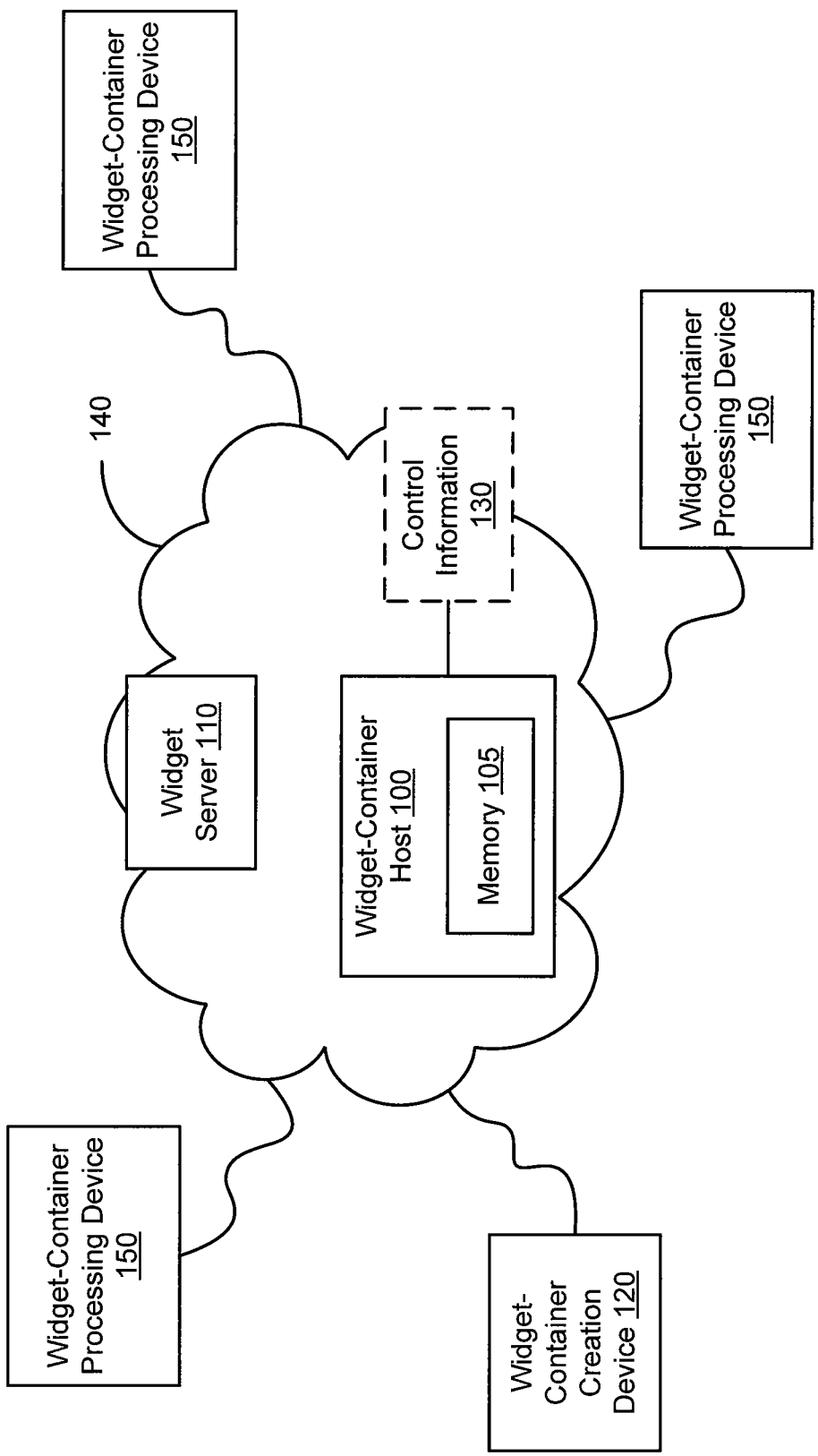
FIG. 1 is a schematic block diagram of a widget-container host configured to control, configure, and coordinate the sending of widget-containers and/or components of a widget-container to widget-container processing devices based on control information, according to an embodiment of the invention.

A widget-container (also can be referred to as a container) is a procedural software framework that can be configured to contain a widget and/or contain at least one service module that can be associated with the widget and/or widget-container. As a procedural software framework, the widget-container can be a series of instructions that are executable (e.g., interpretable) by, for example, a processor of, for example, a computer or mobile phone. The widget and/or service module is "contained" in the widget-container when a widget and/or service module is either referenced in a widget-container or actually integrated into the procedural software framework of the widget-container. In some embodiments, the widget-container includes a portion that is configured for processing of the widget within the widget-container. The widget and/or service module when being contained in the widget-container can be referred to as being wrapped or containerized in the widget-container. In some embodiments, the widget and/or the service module (or references to the widget and/or service module) can be referred to as components or portions of the widget-container.

The widget-container is a portable framework that can be referenced in (e.g., embedded in, referenced using an embed or object tag) and/or accessed from/using a content aggregation point (e.g., web-page, wireless access protocol (WAP) page). For example, when a request for the widget-container (and a widget associated with the widget-container) is received in response to a reference to the widget-container being accessed from a content aggregation point, the widget-container can be served for execution within the content aggregation point in response to the request. The widget can be any type of object such as a static data object (e.g., text or textual document), media object (e.g., video, mp3, or image), and/or software object (e.g., javascript, Flash program) that can be contained (e.g., integrated or referenced) and/or processed in the widget-container. Components of the widget-container are processed in the widget-container when they are, for example, executed, rendered, manipulated, and/or displayed.

Placing, sending (e.g., sending and instance of, serving and instance of), and/or processing of a portion associated with a widget-container (e.g., entire widget-container) can be restricted or allowed (e.g., permitted) based on control information (e.g., restriction/blocking information, allowance/permission information) and based on parameter values/identifiers, for example, included in a request for a widget-container. This determination can be referred to generically as a control determination, or as a restriction determination or an allowance determination. The parameters/identifiers can be, for example, extracted from a reference associated with a widget-container and/or associated with a content aggregation point where a reference to the widget-container has been placed.

The control information can be, for example, a control rule, a control condition, and/or a control instruction that can be associated with any portion associated with the widget-container. In some embodiments, for example, control information can be based on a metadata parameter value (e.g., tracking parameter values) associated with a portion associated with a widget-container and stored in a database such as a metadata database. More details regarding metadata parameter values as related to a widget-container are set forth in co-pending application Ser. No. 11/537,375, "Method and Apparatus for Widget Container/Widget Tracking and Metadata Manipulation," which is incorporated herein by reference in its entirety.

A control determination (e.g., restriction determination, allowance determination) can be performed at various times. For example, a control determination can be performed before or in response to a widget-container being placed in a content aggregation point, before the widget-container is sent to a widget-container processing device, or after the widget-container is sent to a widget-container processing device. For example, a widget can be prevented from processing in a widget-container before the widget-container is sent to a widget-container processing device based on, for example, content included in a content aggregation point where the widget is to be processed. In some embodiments, a control determination can prevent (e.g., block) a widget-container from being placed in one or more specified content aggregation points.

A content aggregation point can be, for example, a desktop, a start page, a wireless application protocol (WAP) gallery, a gallery, a portal, a processor readable-vehicle (e.g., web-page, web site), and/or a directory. WAP galleries, web galleries, and so forth are types of content aggregation points that can be referred to as content distribution points because they can be vehicles from which content such as widgets and/or widget-containers can be distributed. A content distribution point can be a type of processor-readable vehicle. More details regarding processor-readable vehicles are set forth in co-pending application Ser. No. 11/537,362, "Method and Apparatus for Widget-Container Hosting and Generation," which is incorporated herein by reference in its entirety.

The widget-container can be defined (e.g., dynamically generated) and/or modified to control processing and/or sending associated with the widget-container in accordance with a control determination (e.g., restriction determination, allowance determination). Modifying the widget-container, for example, can enable control of the processing and/or sending of portions of a widget-container such as a widget and/or a service module even when these components are served from separate devices/locations. Statistics related to control determinations can be collected and/or processed and proactive control determinations can be performed based on the placement (e.g., parentage, tracking) of widget-containers. The statistics can be based on tracking parameters associated with a metadata database.

Although many of the embodiments within the detailed description are described with respect to portions associated with widget-containers (e.g., widget associated with a widget-container, service module associated with a widget-container, widget-container framework, entire widget-container containing a widget(s) and/or a service module(s)) a person of skill in the art, having the benefit of this disclosure, can recognize that the methods and apparatus associated with the embodiments can be applied to widgets that are not associated with a widget-container.

Referring now to the drawings, FIG. 1 is a schematic block diagram of a widget-container host 100 configured to control, configure, and/or coordinate the sending of widget-containers and/or components of a widget-container to widget-container processing devices 150 based on control information 130, according to an embodiment of the invention. A widget-container is a procedural software framework that can contain (e.g., include a reference to) one or more components such as a widget and/or a service module.

The widget-container can be executed on various platforms (e.g., mobile phone, personal computer, personal digital assistant (PDA)) and instances of references to the widget-container can be included in and/or spread to a variety of locations such as content aggregation points (e.g., web sites, WAP site) that can be content aggregation points executed (e.g., read) using the widget-container processing devices 150. The widget-container can be configured to include a portion configured for processing one or more widgets when the widget-container is executed at a widget-container processing device 150. The service module (or reference to the service module) contained in the widget-container can be a pre-defined and/or customizable (e.g., user-defined) function related to a variety of functions (e.g., tracking, placing) related to the widget-container and/or its components (e.g., widget). More details related to widget-container spreading and components are set forth in the above-identified co-pending application entitled, "Method and Apparatus for Widget-Container Hosting and Generation."

The service module and/or widget can be wrapped in the widget-container, for example, at the time that the widget-container is first defined, after the widget-container has been generated before serving, dynamically when the widget-container is being served, and/or after the widget-container has been served. In some embodiments, the widget-container can be produced dynamically and/or statically for storage, for example, using a hardware and/or software generation engine (not shown) that can be included in the widget-container host 100 and/or a widget-container creation device 120. In some embodiments, the widget-container can be dynamically modified using dynamic injection (i.e., injecting data into the widget-container just before/when the widget-container is served). More details related to dynamic widget-container generation are set forth in the above-identified co-pending application entitled, "Method and Apparatus for Widget-Container Hosting and Generation."

Each of the widget-container processing devices 150 (also can be referred to as a processing device) can be any type of device that is configured to process the widget-container and a widget and/or service module that can be contained in the widget-container. Each of the widget-container processing devices 150 can be, for example, a computer, a mobile phone, a PDA, a server, and/or any other processor-based device. The widget-container can be configured such that the widget-container can be processed by each of these widget-container processing devices 150 even though the platforms (e.g., hardware, architecture, software, operating system, runtime libraries, programming languages) of the respective widget-container processing devices 150 may be different. The network 140 can be any type of network such as a local area network (LAN) and/or a wide area network (WAN) implemented as a wired and/or wireless network with one or more segments in a variety of environments such as, for example, an office complex.

The widget-container host 100 is configured to use the control information 130 to determine whether or not to allow any portion associated with a widget-container to be sent to and/or processed at one or more of the widget-container processing devices 150. For example, the widget-container host 100 can receive a request for a widget-container from a widget-container processing device 150. Based on a parameter value/identifier included in the request and based on the control information 130, sending a portion associated with a widget-container that is stored at the widget-container host 100 and/or dynamically generated at the widget-container host 100 can be restricted or allowed. In some embodiments, the parameter value/identifier can be retrieved from, for example, a metadata database (not shown) based on a value included in the request. In some embodiments, for example, the widget-container host 100 can be configured to determine whether or not one or more service modules should be contained in a widget-container based on the control information 130.

The block diagram also illustrates a widget-server 110 in communication with the widget-container processing devices 150 via network 140. Assuming that sending of a widget is permitted, the widget server 110 can be configured to store and send the widget referenced within a widget-container. For example, in response to a request for the widget, if allowed based on the control information 130, the widget server 110 can send (e.g., serve) the widget to one or more of the widget-container processing devices 150. In some embodiments, the request for the widget can be defined based on a reference to a widget being accessed from an instance of the widget-container at a widget-container processing device 150. The widget can then be sent from the widget server 110 to the widget-container processing device 150 and processed within the instance of the widget-container.

The widget-container host 100 can be configured to control sending and/or processing of any portion (e.g., widget) of a widget-container by modifying the widget-container in a variety of ways. For example, if processing of a widget within an instance of a widget-container is restricted based on the control information 130, a reference to the widget that is normally included in the widget-container can be removed when the instance of the widget-container is generated and/or served (e.g., sent). In other words, the widget-container can be modified such that processing of the widget is prevented. Because the widget server 110, for example, may not have access to the control information 130 and/or may not be configured to process the control information 130, the sending of the widget from the widget server 110 can be controlled by modifying the widget-container associated with the widget.

In some embodiments, the widget-container host 100 can modify a widget-container such that a reference to a portion that is typically included in the widget-container is not included in the widget-container when the widget-container is generated or can be removed after the widget-container is generated. In some embodiments, the widget-container host 100 can also include a null reference in place of a valid reference to a portion associated with the widget-container (e.g., widget). This can effectively prevent the portion from being sent and/or processed. The widget-container host 100, in some embodiments, can send an indicator to, for example, a widget-container processing device 150 to trigger the widget-container processing device 150 to stop processing a portion associated with a widget-container. In some embodiments, the widget-container host 100 can send an indicator to, for example, the widget server 110 to prevent the widget server 110 from sending (e.g., block streaming) a widget for processing within a widget-container.

A control determination can be based on parameters and/or identifiers included in a request for a widget-container that can be, for example, extracted from a reference associated with a widget-container as well as based on control information 130 related to the widget-container stored in a memory (e.g., database). For example, an identifier associated with a placement of a widget-container can be received at the widget-container host 100 in a request for the widget-container and used by the widget-container host 100 with reference to the control information 130 to make a control determination. The request can be defined by any of the widget-container processing devices 150. The widget-container 100 can then generate, modify, and/or send the widget-container based on a result of the control determination.

The control information 130 can be any type of information that can be used to determine whether or not to allow sending and/or processing of portions of a widget-container associated with one or more of the widget-container processing devices 150. For example, the control information 130 can include or be an instruction that specifies whether or not a particular widget, service module, and/or widget-container should be sent to a particular type of widget-container processing device 150. The control information can include information from a whitelist database (e.g., third party whitelist database, widget-container specific whitelist database) or blacklist database (e.g., third party blacklist database, widget-container specific blacklist database) associated with any portion associated with a widget-container.

The control information 130 can be stored in, for example, the memory 105 of the widget-container host 100 or a separate database (e.g., metadata database) that can be accessed by the widget-container host 100 via a network such as network 140. The control information 130 can be associated with or include metadata parameters and metadata parameter values (e.g., tracking parameter values) associated with a widget-container and/or a component of the widget-container (e.g., widget or service module). The metadata parameters and values can be used to, for example, dynamically customize or track the widget-container and/or the component of the widget-container. The control determination (e.g., restriction determination, allowance determination) can include a restriction or allowance of a customizable feature of any portion associated with the widget-container. For example, a determination can be based on a tracking history of a particular viewer of any portion associated with a widget-container, a location where any portion associated with a widget-container is viewed, a placement history of any portion associated with a widget-container.

In some embodiments, any portion associated with the widget-container can be stored and retrieved from the memory 105 of the widget-container host. The memory 105 can be, for example, a database included in the widget-container host 100. In some embodiments, any portion associated with the widget-container can be stored in and accessed from a memory device such as a database that is a remote database and/or a distributed database that can be accessed by the widget-container host 100 via network 140 or via a separate network (not shown). In some embodiments, a widget-container served from the widget-container host 100 can contain a reference to one or more service modules that are served from, for example, a service module server (not shown).

Also, as shown in FIG. 1, a widget-container creation device 120 can be connected to the container host 100 via network 140. The widget-container creation device 120 can be used to generate, define, and/or modify a widget-container. The widget-container creation device 120 can be, for example, a personal computer, a mobile device (e.g., mobile phone and/or PDA), and/or a server (e.g., back-end server, network server). In some embodiments, the widget-container creation device 120 can be configured to automatically produce instructions used to generate and/or modify widgets containers, for example, when a widget is received. In many embodiments, the widget-container creation device 120 can also store widgets and function as a widget server. Each of the widget-container processing devices 150 can also be configured to function as a widget-container creation device 120 and vice versa.

The widget-container creation device 120 can trigger the generation and/or modification of the widget-container at the widget-container host 100. In some embodiments, the widget-container creation device 120 can send an instruction from, for example, a processor (not shown) to cause the widget-container host 100 to generate and/or modify a widget-container. In some embodiments, widget-container creation device 120 can trigger the generation and/or modification of the widget-container at the widget-container host 100.

Although in this embodiment, the widget-container host 100 is a centralized control/storage mechanism that manages requests received from container processing devices 150 and manages the sending of widgets containers (e.g., prompts a separate device (not shown) to send a widget-container stored in a separate database (not shown)), the functionality of the widget-container host 100 can be decentralized and/or distributed. For example, a hierarchy of widget-container hosts 100 can be arranged, for example, with management components and/or slave components that control, configure, and coordinate the sending of widget-containers to the widget-container processing devices 150.

Figure 2:
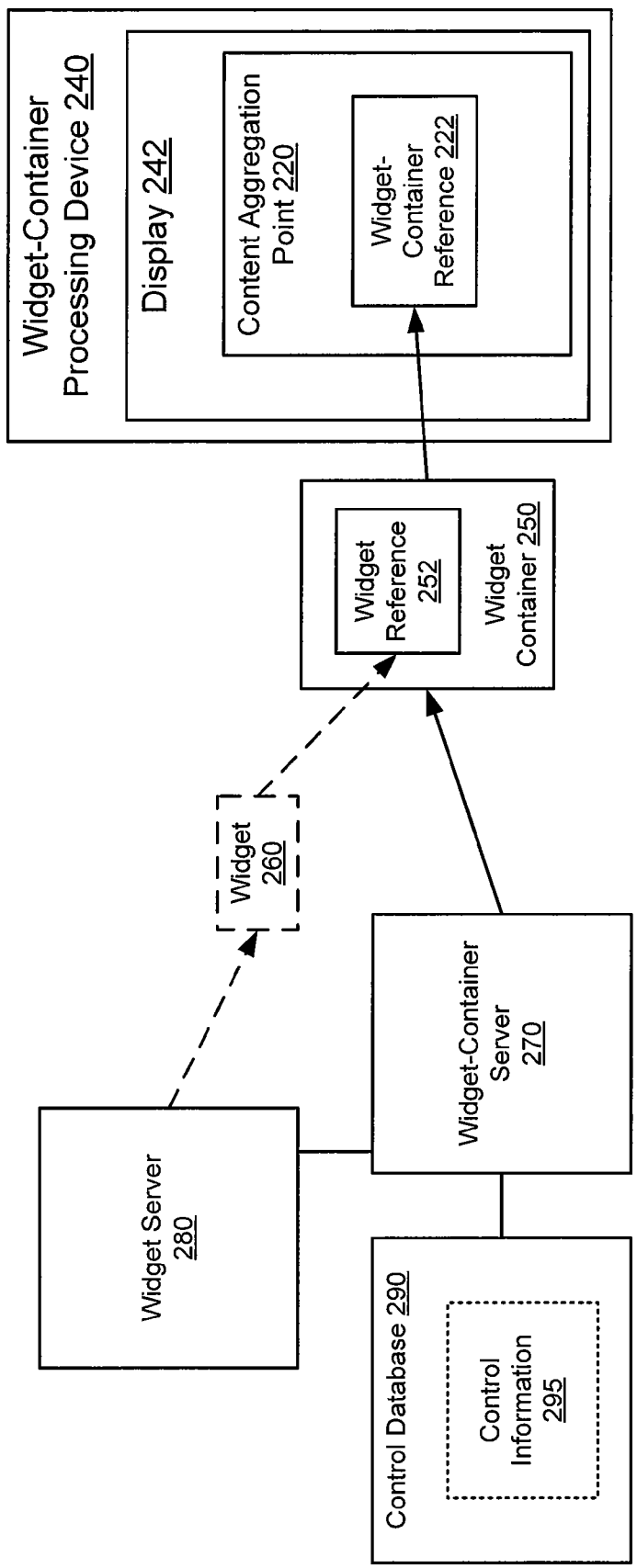
FIG. 2 is a schematic diagram illustrating a widget-container associated with a content aggregation point being displayed at a widget-container processing device, according to an embodiment of the invention.

FIG. 2 is a schematic diagram illustrating a widget-container 250 associated with a content aggregation point 220 being displayed on a display 242 at a widget-container processing device 240, according to an embodiment of the invention. The widget-container server 270 can be configured to determine whether sending/processing of the widget 260 within the widget-container 250 and/or sending/execution of the widget-container 250 are allowed based on control information 295 stored in a control database 290 (also can be referred to as a restriction database or permission database).

As shown in FIG. 2, the widget-container 250 is served from the widget-container server 270 to the widget-container processing device 240 in response to a widget-container reference 222 being accessed from the content aggregation point 220. The widget-container reference 222 is defined to trigger sending of the widget-container 250 from the widget-container server 270 for display in the content aggregation point 220, for example, when accessed. In some embodiments, the widget-container 250 can be dynamically generated based on an instruction used to define the widget-container 250 or retrieved (e.g., from a memory (not shown)) before the widget-container 250 is served (e.g., sent) to the widget-container processing device 240. The generating or retrieving of the widget-container 250 can be triggered in response to a request for the widget-container 250.

After the widget-container 250 has been received at the widget-container processing device 240, a widget 260 is served from a widget-server 280 for processing (e.g., execution) within the widget container 250 in response to a widget reference 252 being accessed from the widget-container 250. The widget 260 is served from the widget server 280 in response to a request for the widget 260 defined based on the widget reference 252. In some embodiments, the widget 260 can be requested, received, and/or processed within the widget-container 250 after the widget-container 250 is received at the content aggregation point 220.

The content aggregation point 220 can be, for example, a web-page, and the widget-container reference 222 can be, for example, an embed tag included in the content aggregation point 220. In some embodiments, the widget-container 250 is a Flash object and the content aggregation point 220 is a Flash-enabled web browser or Flash-enabled web browser page.

Although FIG. 2 illustrates a single instance of the widget-container 250/widget 260 being sent to content aggregation point 220, multiple instances of the widget-container 250/widget 260 can be synchronously or asynchronously generated (e.g., dynamically generated) and/or distributed to multiple widget-container processing devices and/or to multiple content aggregation points that each include a reference to the widget-container 250.

The widget-container server 270 can be configured to determine whether processing of the widget 260 within the widget-container 250 and/or sending/execution of the widget-container 250 are allowed based on control information 295. Although, in this embodiment, the control information 295 is stored in and accessed by the widget-container server 270 from a control database 290, in some embodiments, the control information 295 can be stored in a memory (not shown) of the widget-container server 270 or in a set of distributed memory devices (not shown) such as distributed databases. In some embodiments, the control information 295 can be generated and/or collected by the widget-container server 270 when needed. In some embodiments, the control database 290 can be a third-party database that includes control information 295 such as a white-list or a black-list.

The control information 295 can be defined by the owner of widget 260 and/or the owner/creator of the widget-container 250. Although the widget 260 and the widget-container 250 can be served from two different devices—the widget server 280 and widget-container server 270, respectively—the owner of each can be the same entity. The owner of the widget 260, for example, can define a control rule or control condition based on content (e.g., images, text) associated with content aggregation point 220 (e.g., web-page, WAP page). The owner of widget 260 may restrict (or allow) processing of widget 260 within the content aggregation point 220 because the content of content aggregation point 220 may be viewed as conflicting or incompatible with the content of widget 260.

In some embodiments, the control information 295 can be based on a content rule associated with a content aggregation point. More details regarding content rules associated with content aggregation points are set forth in co-pending application Ser. No. 11/682,626, filed on Mar. 6, 2007, and entitled, "Method and Apparatus for Widget-Container Platform Adaptation and Distribution" which is incorporated herein by reference in its entirety.

The control information 295 can be related to any type of information that can be used to determine whether or not to allow processing of widget 260 within the widget-container 250 and/or whether or not to allow sending of the widget-container 250 to the widget-container processing device 240 for execution within the content aggregation point 220. For example, the control information 295 can be configured such that a control determination (e.g., restriction determination, allowance determination) can be based on an identifier (e.g., uniform resource locator (URL), uniform resource identifier (URI)) associated with the content aggregation point 220 where the widget-container reference 222 is placed. The control information 295 can include, for example, a rule that indicates whether processing of widget 260 in content aggregation point 220 is allowed or restricted.

In some embodiments, a control determination can be based on a location of the widget-container processing device 240. For example, an indicator (e.g., Internet Protocol (IP) address or portion of an IP address) of the location of the widget-container processing device 240 can be used to determine whether or not to allow sending a portion associated with the widget-container 270 to the widget-container processing device 240.

In some embodiments, a control determination can be performed in response to the widget-container 250 being placed (e.g., widget-container reference 222 to the widget-container 250 being placed) in content aggregation point 220. The result of the control determination can be stored (e.g., at the widget-container host 100) and associated with a placement identifier uniquely associated with the placement of the widget-container 250 in the content aggregation point 220. If the unique placement identifier is received in a request for an instance of the widget-container 250, the result of the control determination can be immediately implemented without performing the control determination a second time. If the widget-container reference 222 is uniquely associated with the placement of the widget-container 250 in the content aggregation point 220, the widget-container reference 222 can be used as the trigger for implementing the stored control determination result.

Although not illustrated in this embodiment to simplify the discussion, the widget-container 250 can also contain a service module integrated into the widget-container 250 (e.g., integrated during dynamic generation) or served from, for example, a service module server (not shown). A control determination can also be based on or related to the service module. The service module can be a pre-defined function associated with the widget 260. For example, a service module can be a metadata searching/retrieval function, a polling/categorizing function, a widget-container deployment function (e.g., using a placement service module), a transaction service function (e.g., service module for facilitating a web purchase, service module used for signing a user up for a web service, etc.), a security function (e.g., security firewall function), and/or a widget-container tracking function.

The widget 260 can be, for example, a static data object, a software object, and/or a media object. Within each of these categories, the widget can be a specific content type. For example, the widget 260 can be an processed (e.g., played) or a displayed media object such as a video file (i.e., a video content file), an mp3 file (i.e., audio content file), or an image file (i.e., image content file). The widget 260 can be a static data object that is, for example, displayed within the widget-container 250. The static data object can be, for example, a textual object such as a set of letters, a textual document, or an html based textual document. The static data object can include, for example, links to other widgets (not shown). The widget 260 can also be a software object such as an executable application or set of instructions that is executed within the procedural software framework of the widget-container 250. The results of the executable application can be included and/or displayed within the procedural software framework of the widget-container 250. The widget-container 250 can be configured so that the widget 260 can be processed within a portion of the widget-container 250 when the widget-container 250 is displayed on the display 242.

The procedural software framework that makes up the widget-container 250 can be programmed in any number of programming languages that are compiled (e.g., C++) and/or in programming languages that are interpreted (e.g., Java). An executable portion (of the procedural software framework) that manages and controls service module(s) (not shown) and/or the widget 260 referenced (e.g., contained) in the widget-container 250 can be referred to as the core of the widget-container 250. Metadata parameter values can be passed to the widget-container 250 and used by, for example, the core of the widget-container 250 to modify, for example, attributes of the widget-container 250 and/or widget 260 (e.g., x, y location of the widget 260, size of the widget 260, color, themes, styles, etc.).

FIG. 3 is a table 300 that illustrates a set of control rules (e.g., restriction information) that are based on content aggregation point identifiers 340, according to an embodiment of the invention. The table 300 illustrates that execution of widget-container A (column 310) is allowed in content aggregation points with identifiers URI1 and URI2. Based on an indicator of the content aggregation point identifier 340 received in, for example, a request for widget-container A, table 300 can be used in a control determination to determine that processing of widget W is restricted in content aggregation point URI2, but allowed in content aggregation point URI1.

The identifier of the content aggregation point 340 can be received at, for example, a widget-container host for use in a control determination at the widget-container host. A request for the widget-container 310, for example, can include the identifier of the content aggregation point 340 or a separate identifier such as a placement identifier 330 that can be used to look-up the identifier of the content aggregation point 340. In some embodiments, the identifier of the content aggregation point 340 can be retrieved from a metadata database (not shown) that can be used to associate a widget-container reference with the identifier of the content aggregation point 340.

Although, a control determination can be based on one or more content aggregation point identifiers 340, in some embodiments, a control determination can be performed based on a variety of parameters that can be, for example, stored in a metadata parameter database. For example, a control determination can be based on parentage information in a metadata database (not shown) or a placement identifier 330 associated with a particular placement of a reference to a widget container 310 in a content aggregation point 345 associated with the content aggregation point identifiers 340.

For example, in some embodiments, the placement identifier 330 is included in a reference to a widget-container 310 placed in a content aggregation point 345 and can be used in a control determination. When a reference to widget-container A is accessed from a content aggregation point 345, a request for widget-container A can be defined to indicate the placement identifier 330 uniquely associated with the particular placement of widget-container A and included in the reference. If the widget-container A being requested is the widget-container placed in the content aggregation point X, the request can include the placement identifier P1 from the reference. The placement identifier P1 can then be used to determine based on table 300 that both widget processing and widget-container execution are permitted.

In some embodiments, the control information in table 300 can be used in conjunction with a default rule that processing of a widget and/or sending/execution of a widget-container is restricted unless allowed. In this situation, the determination can be referred to as an allowance determination. Conversely, a set of control rules can be defined such that processing of a widget and/or sending/execution of a widget-container is allowed unless restricted based on a control rule in a control database. In this situation, the determination can be referred to as a restriction determination.

Referring back to FIG. 2, widget-container 250 can also include a tracking kernel (not shown) configured to perform a tracking function. The tracking kernel, which can also be referred to as a tracking module, can be embedded/integrated in (e.g., programmed within) the procedural software framework of the widget-container. The tracking kernel, in some embodiments, may not be displayed on the display 242. The tracking kernel can be used to collect tracking parameter values related to user-triggered interactions with the widget-container 250 such as basic mouse movement and clock events.

The tracking kernel can also be used to collect tracking parameter values related to placement information such as, for example, what web-page (e.g., content aggregation point 220) a widget-container is referenced on and/or placed on, where on the page it was placed, and/or size of the widget-container 250 (e.g., dimensional and memory). This information can be used in a control determination. For example, a tracking parameter value(s) can be used to determine whether a reference to a widget-container will trigger a portion associated with the widget-container to be processed in a portion of a web-page, such as processor readable vehicle 220, that is not allowed based on the control information 295. The tracking parameter value can be used to determine whether the widget-container should be processed on the web-page at all based on the control information 295. Certain user-triggered interactions based on a tracking parameter value can also trigger restriction (or allowance) of a portion associated with a widget-container from being processed and/or executed.

In some embodiments, a control rule can be a complex set of rules based on one or more variables and/or an algorithm. For example, a control rule can be based on portions of multiple widget-containers placed within a particular content aggregation point that are defined as mutually exclusive portions of widget-containers (e.g., should not be displayed on the same content aggregation point, should not be displayed on a specified content aggregation point). In some embodiments, a control determination based on a complex set of rules can be performed based on tracking parameter values (e.g., parentage information) collected and/or stored in, for example, a metadata database (not shown) or the control database 290.

In some embodiments, a notification can be sent to an entity associated with a component of the widget-container 250 that indicates that processing of a particular component of the widget-container 250 such as the widget 260 has been terminated. The notification can be generated and sent by, for example, the widget-container server 270. The notification can include statistical data that indicates, for example, one or more content aggregation points, locations, and/or processing devices where the processing of the widget 260 has been terminated or permitted. The statistical data can be based on tracking parameter values and/or parentage information associated with the widget 260 of the widget-container. For example, control results for a portion associated with a widget-container with a particular genealogical lineage can be compiled and sent in a notification. In some embodiments, statistical data based on control information can be stored in, for example, the control database 290 where the statistical data can be retrieved. In some embodiments, historical termination data can be used to update, for example, control information 295 in the control database 290.

Figure 4:
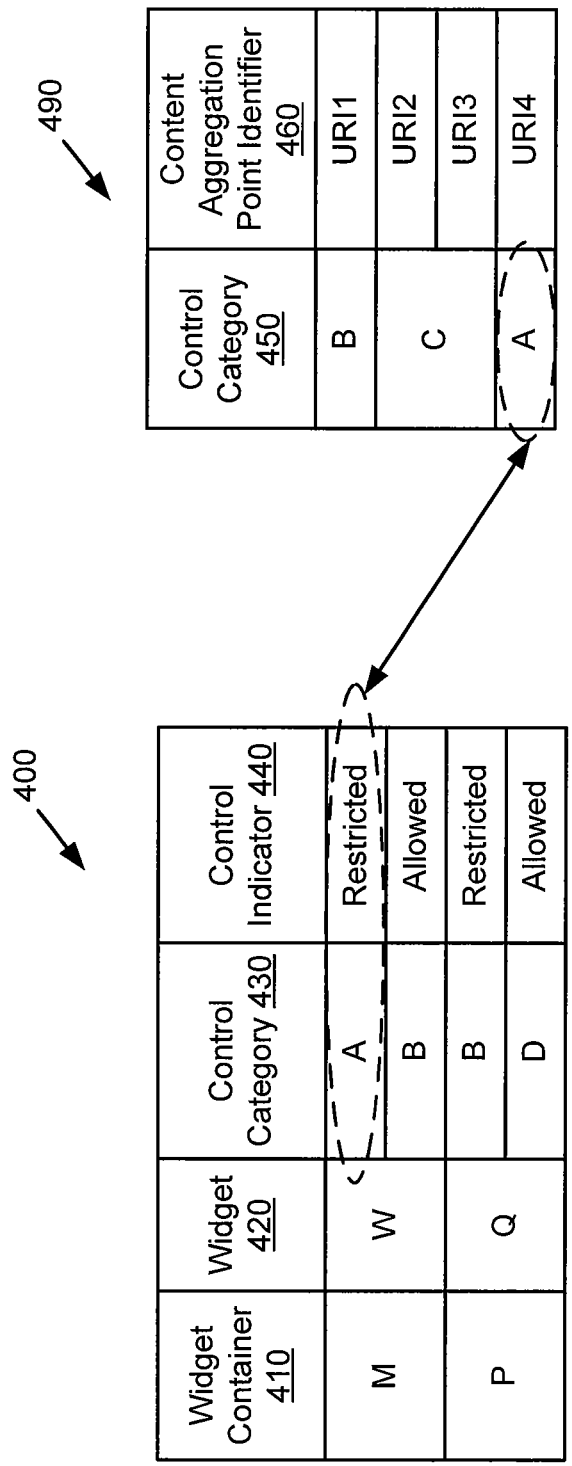
FIG. 4 illustrates a set of category-based control tables that can be used in a control determination, according to an embodiment of the invention.

FIG. 4 illustrates a set of category-based control tables 400 and 490 that can be used in a control determination, according to an embodiment of the invention. Table 400 illustrates that each widget 420 of the widget-containers 410 has been associated with a control category 450 and a control indicator 440. Table 400 is a set of rules that indicates whether widget 420 should be processed within a content aggregation point that has been classified as a certain control category 430. For example, table 400 illustrates widget W can be processed in a content aggregation point with a control category 430 of A, but not a control category 430 of B. In some embodiments, table 400 can also be used as a set of rules to determine whether or not widget-containers 410 or service modules (not shown) should be sent to or processed within a content aggregation point that has been classified as a certain control category 430.

Table 490 illustrates a set of control categories 450 associated with content aggregation points identifiers 460. The control categories 450 can be determined based on, for example, an assessment (e.g., content scan) of each of the content aggregation points where a widget-container 410 has been placed. In some embodiments, a regular (e.g., nightly) or random assessment of content of content aggregation points, for example, can be used to update table 490. An assessment of content can be based on, for example, a scanned image of a content aggregation point. The assessment of the content of a content aggregation point can be used to update control information associated with any portion associated with a widget-container. In some embodiments, content associated with a particular content aggregation point can be assessed in response to a widget-container reference associated with a widget-container being placed in the particular content aggregation point. In other words, placement of a widget-container (e.g., placement of a reference to a widget container) in a content aggregation point can trigger updating of table 490.

If table 400 is a table stored at, for example, a widget-container server and table 490 is a table stored at a control database, the widget-container server can make a control determination by cross-referencing the control information in table 400 with the control information in table 490 accessed from the control database. The widget-container server can cross-reference the information based on a determination of, for example, a content aggregation point identifier where any of the widget-containers 410 have been placed. For example, if widget-container M has been placed in content aggregation point URI3, a widget-container server can determine using tables 400 and 490 that widget W can be processed within widget-container M at URI3 because content category A is not restricted.

Default rules can be used in conjunction with tables 400 and 490. For example, if widget-container P were placed in URI3, a default rule may prevent processing of widget Q within the widget-container P at URI3 because an existing rule in table 400 does not cover that situation. Although the tables 400 and 490 were illustrated as two separate blocks of information, in some embodiments, the tables 400 and 490 can be combined or portions of either of the tables 400 and/or 490 included as separate blocks of information in, for example, separate databases.

In some embodiments, control categories can be, for example, location-related control categories. For example, a portion associated with a widget-container may be permitted to be processed (or prevented from processing) in only certain locations based on a control category within a control rule. The location control can be defined based on, for example, an Internet Protocol (IP) address associated with a request for the widget-container.

Referring back to FIG. 2, the widget-container server 270 can be configured to make a control determination with respect to the widget 260 and/or widget-container 250 after the widget-container 250 is served (e.g., sent). For example, when the widget-container server 270 determines, after the widget-container 250 has been sent to the widget-container processing device 240, that sending/execution of the widget-container 250 and/or processing of the widget 260 is restricted (or allowed), the widget-container server 270 can send an indicator to the widget-container processing device 240 to stop (or start/continue/allow) execution of the widget-container 250 within the content aggregation point 220 or processing of the widget 260 within the widget-container 250. The widget-container server 270 can passively permit processing if processing of the widget 260 within the widget-container 250 has already commenced and is allowed.

Figure 5:
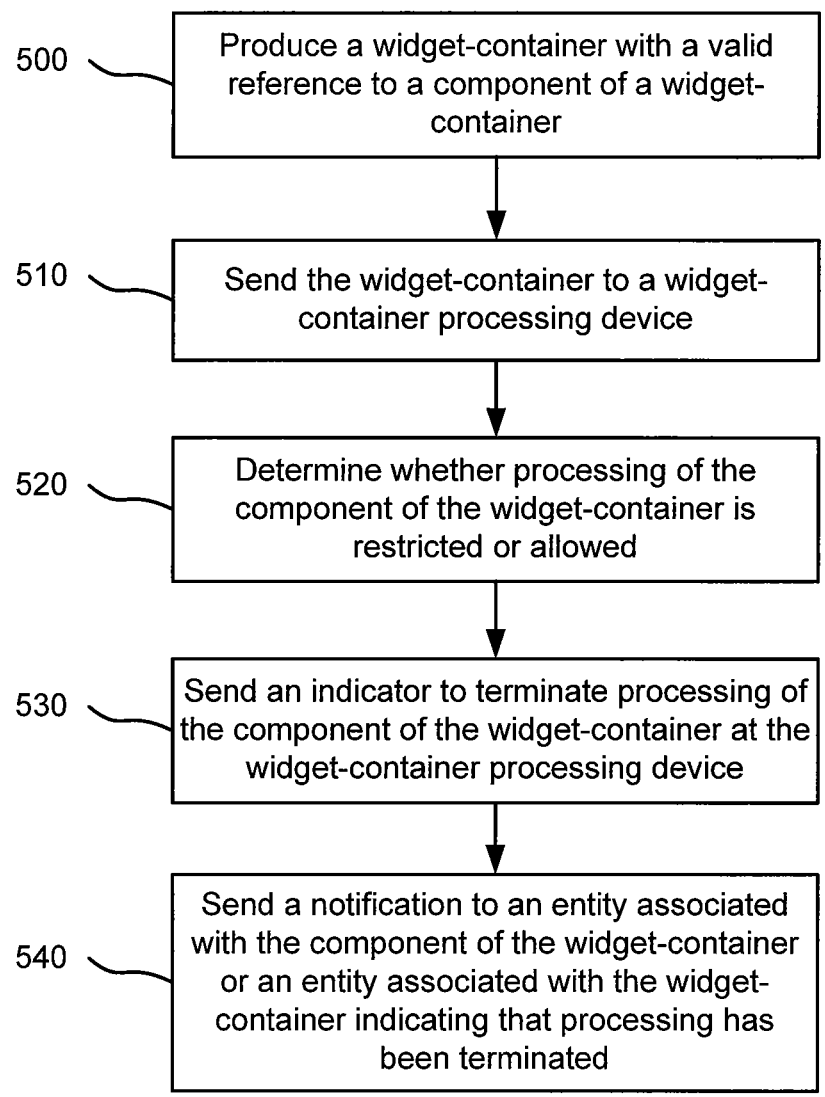
FIG. 5 is a flowchart that illustrates a control determination performed after a widget-container has been sent to a widget-container processing device, according to an embodiment of the invention.

FIG. 5 is a flowchart that illustrates a control determination performed after a widget-container has been sent to a widget-container processing device, according to an embodiment of the invention. The flowchart illustrates that a widget-container is produced (e.g., generated) with a valid reference to a component of the widget-container 500. The valid reference can be a reference to a component of the widget-container such as a widget and/or a reference to a service module associated with the widget. The widget-container can be produced in response to a request for the widget-container defined in response to a reference to the widget-container being accessed from a content aggregation point (e.g., webpage, WAP page) executed/displayed at the widget-container processing device. The widget-container produced at 500 can be an instance that is, for example, generated dynamically with customized features for the content aggregation point based on a metadata parameter value. After the widget-container has been produced, the widget-container is sent to the widget-container processing device such as a cell phone at 510.

After the widget-container has been sent, a control determination (e.g., restriction determination, allowance determination) is performed at 520 to determine whether processing/execution of the component of the widget-container is restricted or allowed. The control determination can be based on control information that is retrieved from a memory such as a control database. The control determination can be based on, for example, an identifier associated with the content aggregation point where the widget-container is to be executed and/or displayed. The control determination can be based on the content of the content aggregation point or the physical location where the content aggregation point is being accessed. The control determination can also be performed based on a credential or location identifier associated with an entity that is requesting the widget-container.

In response to a control determination being made at 520, an indicator to terminate processing/execution of the component of the widget-container at the widget-container processing device is sent at 530. The indicator can be sent to, for example, a widget server to cause the widget server to stop streaming a video widget that is being processed within the widget-container. The indicator can be sent directly to the widget-container processing device and can be configured to cause the widget-container processing device to stop processing/executing the component of the widget-container.

At 540, a notification to an entity associated with the component of the widget-container that processing/execution of that component has been terminated. The notification can include statistical data that indicates, for example, other content aggregation points, locations, and/or processing devices where the processing/execution of the component has been terminated. The statistical data can be based on tracking and/or parentage information associated with any portion associated with the widget-container. In some embodiments, historical termination data can be used to update, for example, a control database.

Although the flowchart shown in FIG. 5 is directed towards components of widget-containers, in some embodiments, the flowchart can be modified to apply to any portion associated with the widget-container including the entire widget-container itself. In some embodiments, the flowchart can be modified such that the blocks are in any order. For example, a notification can be sent to an entity before an indicator to cause termination is generated and/or sent.

Referring back to FIG. 2, the widget-container server 270 can be configured to make a control determination with respect to the widget 260 and/or widget-container 250 before the widget-container 250 is served (e.g., sent). For example, when the widget-container server 270 determines that sending of the widget-container 250 is restricted (or allowed) before the widget-container 250 has been sent, the widget-container server 270 can be configured to deny (or grant) a request for the widget-container 250 and/or can halt (or continue) processing with respect to the widget-container 250.

If the widget-container server 270 determines, before the widget-container 250 has been sent, that processing of the widget 260 is restricted, the widget-container server 270 can still send the widget-container 270. However, the widget-container 270 can be modified, for example, by removing the widget reference 252, including a null (e.g., empty) reference (not shown), and/or a re-directing reference (e.g., to a notice that the widget 260 will not be processed) to prevent a valid request for the widget 260 from being defined and sent to the widget server 280. These techniques will effectively prevent the widget 260 from being sent to and processed in the widget-container 250 at the widget-container processing device 240.

In contrast, if the widget-container server 270 determines that processing of the widget 260 within the widget-container 250 is allowed before the widget-container 250 has been sent, the widget-container server 270 can send the widget-container 250 with a widget reference 252 that is valid. The valid widget reference 252 or null widget reference 252 can be dynamically injected into the widget-container 250 when the widget-container 250 is generated, for example, based on an instruction in response to a request for the widget-container 250. Likewise, a valid widget reference 252 can be removed from the widget-container 250 when the widget-container 250 is dynamically generated.

Whether a control determination is made before or after the widget-container 250 is served, the widget-container server 270 can send an indicator to the widget server 280 to cause the widget server 280 to prevent sending or halt (e.g., block) sending, if necessary, of the widget 260 to the widget-container processing device 240. The widget-container server 270 can cause the widget server 280 to halt sending if sending and/or processing of the widget 260 within the widget-container 250 has already commenced.

In some embodiments, the widget-container processing device 240 and/or widget-container 250 can be configured to wait for an indicator from the widget-container server 270 before processing the widget 260. Likewise, in some embodiments, the widget server 260 can be configured to wait for an indicator from the widget-container server 270 before sending the widget 260 for processing within the widget-container 250. In other words, the default mode of the widget-container processing device 240, widget server 260, and/or widget-container 250 can be to process and/or send the widget 260 when triggered by the widget-container server 270.

Figure 6:
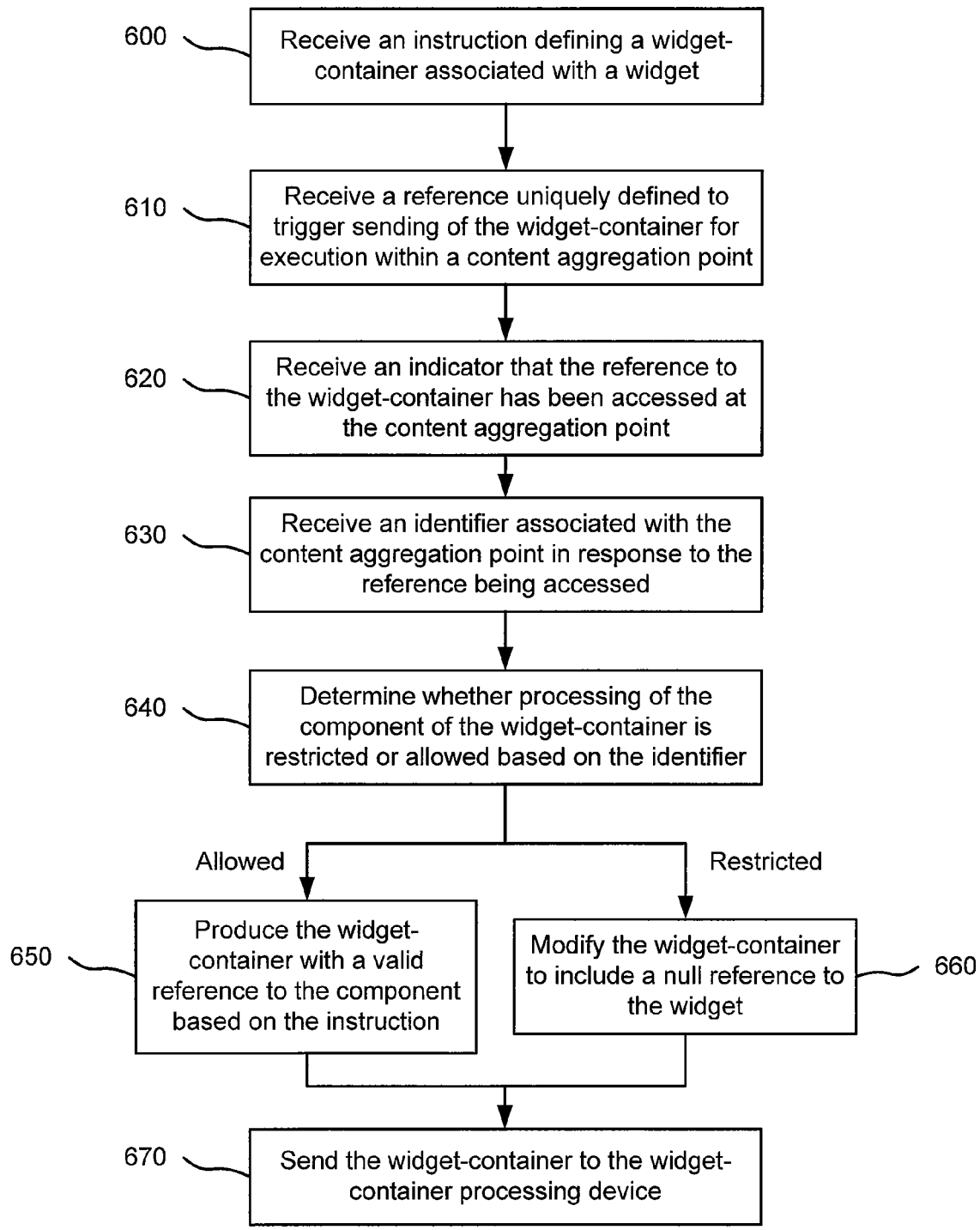
FIG. 6 is a flowchart that illustrates a method for restricting or allowing processing of a component associated with a widget-container before sending the widget-container for display in a content aggregation point, according to an embodiment of the invention.

FIG. 6 is a flowchart that illustrates a method for restricting or allowing processing of a component associated with a widget-container before sending the widget-container for display in a content aggregation point, according to an embodiment of the invention. The flowchart illustrates that an instruction defining a widget-container associated with a widget is received at 600. The instruction can be used to dynamically produce the widget-container when a request for the widget-container is received.

A reference uniquely defined to trigger sending of an instance of the widget-container for execution within a content aggregation point is received at 610. In some embodiments, the reference can be received and stored in a database and associated with customizable parameter values (e.g., metadata parameter values) associated with the placement of the reference to the widget-container in the content aggregation point so that the customizable parameters values can be used when producing the widget-container for sending to the content aggregation point.

An indicator that the reference to the widget-container has been accessed at the content aggregation point is received at 620, an identifier associated with the content aggregation point is received at 630 in response to the reference being accessed, and a control determination is performed at 640 to determine whether processing of any component (include the widget referenced above) of the widget-container is restricted or allowed. For example, the control determination can be based on control information that is retrieved from a memory such as a control database. The control determination can be based on, for example, an identifier associated with the content aggregation point where the widget-container is to be executed and/or displayed.

If the processing of the component of the widget-container is allowed, an instance of the widget-container is produced with a valid reference to the component of the widget-container at 650 based on the instruction. In other words, the widget-container is produced without modifying the instruction or the widget-container with respect to the reference to the component. The instance of the widget-container with the valid reference is then sent to the widget-container processing device that requested the widget-container at 670. In some embodiments, if the widget-container is a static object stored in a memory (e.g., not dynamically generated based on the instruction), the widget-container can be retrieved from the memory and sent to the widget-container processing device. In other words, the widget-container will not be modified.

If the processing of a component of the widget-container is restricted, the widget-container can be modified and/or produced at 660 based on the control determination. The widget-container can be produced based on the instruction with some modification to address the control determination. For example, the widget-container can be produced with a null reference to the component of the widget-container (or a re-directing reference) such that the component of the widget-container is not requested from, for example, a server of the component when the widget-container is executed a widget-container processing device. The modified instance of the widget-container is then sent to the widget-container processing device that requested the widget-container at 670.

In some embodiments, if the widget-container is a static object stored in a memory (e.g., not dynamically generated based on the instruction), the widget-container can be retrieved from the memory and modified to, for example, remove the reference to the component before the widget-container is sent to the widget-container processing device.

Some embodiments of the invention relate to a storage product with a processor-readable medium having instructions or code thereon for performing various processor-implemented operations. The media and code may be those specially designed and constructed for the purposes of the invention, or they may be of the kind well known and available to those having skill in the software arts. Examples of processor-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as floppy or optical disks; carrier wave signals; and hardware devices that are specially configured to store and execute program code, such as Application-Specific Integrated Circuits ("ASICs"), Programmable Logic Devices ("PLDs"), and ROM and RAM devices. Examples of code include, but are not limited to, micro-code or micro-instructions, machine instructions, such as produced by a compiler, and files containing higher-level instructions that are executed by a processor using an interpreter. For example, an embodiment of the invention may be implemented using Java, C++, or other object-oriented programming language and development tools. Additional examples of code include, but are not limited to, control signals, encrypted code, and compressed code.

In conclusion, the present invention is related to an apparatus and methods for controlling processing of and/or distribution of static, media, and/or software objects in a procedural software framework. Those skilled in the art can readily recognize that numerous variations and substitutions may be made in the invention, its use and its configuration to achieve substantially the same results as achieved by the embodiments described herein. Many variations, modifications and alternative constructions fall within the scope and spirit of the disclosed invention as expressed in the claims.

What is claimed is:

1. A method, comprising:
   receiving an instruction used to define a widget-container containing a service module associated with a widget, the service module being different than the widget, the widget-container being a procedural software framework configured to be embedded within a web-page at a widget-container processing device in response to a reference to the widget-container being accessed at the web-page, the widget-container having a portion configured for receiving the widget;
   determining whether processing of the widget within the portion of the widget-container is at least one of restricted or allowed based on at least one of a geographic location associated with the widget-container processing device, an identifier associated with the web-page, or content, other than the widget-container, included in the web-page;
   removing at least one component of the widget-container from the widget-container to produce a modified widget-container when the processing of the widget is restricted; and
   sending, in response to the reference being accessed from the web-page, the modified widget-container to the widget-container processing device when the processing of the widget is restricted.

2. The method of claim 1, further comprising:
   producing the widget-container based on the instruction, the producing includes incorporating a valid reference to the widget in the widget-container in response to the processing of the widget being allowed; and
   sending the widget-container to the widget-container processing device in response to the reference to the widget-container being accessed when the processing of the widget is allowed.

3. The method of claim 2, wherein the producing is performed at a first device, the widget-container processing device is configured to receive the widget from a second device when processing the widget within the widget-container and when the processing of the widget is allowed.

4. The method of claim 1, wherein the service module is a pre-defined function associated with the widget-container, the widget is at least one of a static data object, a media object, or a software object.

5. The method of claim 1, further comprising:
   producing the widget-container based on the instruction, the producing includes incorporating at a first time a reference to the widget in the widget-container;

sending at a second time the widget-container to the widget-container processing device in response to the reference to the widget-container being accessed at the web-page, the second time being after the first time, the determining includes determining at a third time that processing of the widget is at least one of restricted or allowed, the third time being after the second time; and sending, in response to the determining, to the widget-container processing device an indicator configured to stop processing of the widget within the widget-container.

6. The method of claim 5, wherein the determining includes determining before the reference is accessed.

7. The method of claim 1, wherein the web-page is a first web-page, the reference is a first reference derived from a second reference to the widget-container included in a second web-page, the determining includes determining after the first reference is included in the first web-page.

8. The method of claim 1, wherein the determining is in response to the reference being placed within the web-page.

9. A non-transitory processor-readable medium comprising code representing instructions to cause a processor to:
receive a first reference to a widget-container placed in a first web-page, the first reference being derived from a second reference to the widget-container placed in a second web-page, the second reference being derived from a third reference to the widget-container placed in a third web-page, the widget-container being a procedural software framework configured to be executed at a widget-container processing device in response to the first reference to the widget-container being accessed at the widget-container processing device, the widget-container having a portion configured for receiving a component; and
determine whether processing of the component within the widget-container is at least one of restricted or allowed based on at least one control rule in response to the first reference to the widget-container being accessed, the at least one control rule being associated with the second reference and the third reference.

10. The non-transitory processor-readable medium of claim 9, wherein the first reference is uniquely defined to trigger sending of the widget-container for execution within a location of the first web-page.

11. The non-transitory processor-readable medium of claim 9, further comprising code representing instructions to cause the processor to:
retrieve an identifier associated with the first web-page in response to the first reference being accessed at the widget-container processing device, the code representing instructions to cause the processor to determine including code representing instructions to cause the processor to determine based on the identifier.

12. The non-transitory processor-readable medium of claim 9, further comprising code representing instructions to cause the processor to:
generate the widget-container based on an instruction defining the widget-container in response to the first reference being accessed;
incorporate at a first time a valid reference to the component in the widget-container in response to an indicator that processing of the component is allowed; and
trigger at a second time sending the widget-container to the widget-container processing device, the second time being after the first time.

13. The non-transitory processor-readable medium of claim 9, wherein the code representing instructions to cause the processor to determine includes code representing instructions to cause the processor to determine whether processing of the component within the widget-container is at least one of restricted or allowed based on an identifier associated with the first web-page and in response to the first reference being placed in the first web-page.

14. The non-transitory processor-readable medium of claim 9, further comprising code representing instructions to cause the processor to:
trigger sending a notification to an entity associated with the component, the notification including an indicator of whether processing of the component is at least one of restricted or allowed.

15. The non-transitory processor-readable medium of claim 9, wherein the code representing instructions to cause the processor to determine includes code representing instructions to cause the processor to determine whether processing of the component within the widget-container is at least one of restricted or allowed based on parentage information associated with the first reference being derived from the second reference.

16. The non-transitory processor-readable medium of claim 9, wherein the code representing instructions to cause the processor to determine includes code representing instructions to cause the processor to determine whether processing of the component within the widget-container is at least one of restricted or allowed based on at least one rule associated with the first reference, the at least one rule being associated with the first reference in response to the first reference being derived from the second reference, a result of applying the at least one rule to the first reference being different than a result of applying the at least one rule to the second reference.

17. The non-transitory processor-readable medium of claim 9, wherein the code representing instructions to cause the processor to determine includes code representing instructions to cause the processor to determine that processing of the component within the widget-container is restricted, the code further comprising code representing instructions to cause the processor to:
define a modified widget-container based on the component within the widget-container being restricted, the modified widget-container not including the component; and
send the modified widget-container to the widget-container processing device.

18. A method, comprising:
receiving a request for a widget-container from a widget-container processing device in response to a reference to the widget-container being accessed from a web-page at the widget-container processing device;
determining, in response to the request, that processing of a portion of the widget-container is restricted based on a preference associated with the portion of the widget-container and an identifier associated with the web-page;
removing, based on the determining, the portion of the widget-container from the widget-container to produce a modified widget-container; and
sending, in response to the request, the modified widget-container to the widget-container processing device.

19. The method of claim 18, wherein the sending includes sending after the determining.

20. The method of claim 18, wherein the preference is associated at a first time with the portion of the widget-container, the reference to the widget-container is associated with the web-page at a second time, the second time being after the first time, the determining includes determining after the second time.

21. The method of claim 18, wherein the reference is uniquely defined to trigger sending of the widget-container for execution within a location of the web-page, the reference is from a plurality of references to the widget-container, each reference from the plurality of references is derived from a separate reference from the plurality of references.

\* \* \* \* \*

UNITED STATES PATENT AND TRADEMARK OFFICE
CERTIFICATE OF CORRECTION

| | | |
|---|---|---|
| PATENT NO. | : 9,009,728 B2 | Page 1 of 1 |
| APPLICATION NO. | : 11/682639 | |
| DATED | : April 14, 2015 | |
| INVENTOR(S) | : Stewart O. Allen | |

It is certified that error appears in the above-identified patent and that said Letters Patent is hereby corrected as shown below:

In the Claims

Column 17, line 13 (claim 6):

"includes determining before the reference is accessed" should read --includes determining before the reference to the widget-container is accessed--.

Signed and Sealed this
Third Day of November, 2015

Michelle K. Lee
*Director of the United States Patent and Trademark Office*